United States Patent
Monnereau

(10) Patent No.: US 10,350,805 B2
(45) Date of Patent: Jul. 16, 2019

(54) METHOD FOR REGULATING AN EXTRUSION DEVICE AND EXTRUSION DEVICE USING SAID METHOD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Patrice Monnereau, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 600 days.

(21) Appl. No.: 14/654,979

(22) PCT Filed: Dec. 19, 2013

(86) PCT No.: PCT/EP2013/077433
§ 371 (c)(1),
(2) Date: Jun. 23, 2015

(87) PCT Pub. No.: WO2014/102143
PCT Pub. Date: Jul. 3, 2014

(65) Prior Publication Data
US 2015/0343692 A1    Dec. 3, 2015

(30) Foreign Application Priority Data

Dec. 27, 2012  (FR) .................................. 12 62816

(51) Int. Cl.
*B29C 43/46*   (2006.01)
*B29C 48/355*  (2019.01)
(Continued)

(52) U.S. Cl.
CPC ............ *B29C 48/08* (2019.02); *B29C 43/222* (2013.01); *B29C 43/245* (2013.01); *B29C 43/46* (2013.01);
(Continued)

(58) Field of Classification Search
CPC ..................................................... B29C 47/92
(Continued)

(56) References Cited

U.S. PATENT DOCUMENTS 3,871,810 A * 3/1975 Geyer ..................... B29C 47/32
                                                   425/374
4,137,028 A * 1/1979 Reitemeyer ........... B29C 47/901
                                                   264/209.1
(Continued)

FOREIGN PATENT DOCUMENTS

| JP | S62174127 A | 7/1987 |
| JP | H0985801 A | 3/1997 |
| JP | 2006305976 A | 11/2006 |

OTHER PUBLICATIONS

International Search Report PCT/EP2013/077433 dated Feb. 12, 2014.

*Primary Examiner* — Francisco W Tschen
(74) *Attorney, Agent, or Firm* — Dickinson Wright PLLC

(57) ABSTRACT

Method for regulating an extrusion device for the manufacture of a continuous strip of profiled product (P) made of an elastomeric compound, comprising a screw rotationally driven in a fixed barrel the outlet of which comprises an extrusion die and at least one rotationally driven cylindrical roller, the rotational speed of the screw ($\Omega_{screw}$) being directly connected to the rotational speed of the roller ($\Omega_{roller}$) by a proportionality coefficient, including:

for a given elastomeric compound and a given profiled product (P), determining a setpoint value Ks of the proportionality coefficient, (Continued)

measuring the thickness (e) of the profiled product (P) leaving the extrusion die at each instant and correcting the value of the proportionality coefficient to Ks', correcting the rotational speed of the screw taking account of the corrected value Ks' of the proportionality coefficient, such that $\Omega'_{screw} = Ks' * \Omega_{roller}$ The roller speed is adjusted as a function of the corrected value Ks' of the proportionality coefficient.

2 Claims, 3 Drawing Sheets

(51) Int. Cl.
- *B29K 21/00* (2006.01)
- *B29C 48/35* (2019.01)
- *B29C 48/395* (2019.01)
- *B29C 48/08* (2019.01)
- *B29C 48/92* (2019.01)
- *B29C 43/24* (2006.01)
- *B29C 43/22* (2006.01)
- *B29C 48/30* (2019.01)
- *B29L 30/00* (2006.01)

(52) U.S. Cl.
CPC .............. *B29C 48/30* (2019.02); *B29C 48/35* (2019.02); *B29C 48/355* (2019.02); *B29C 48/395* (2019.02); *B29C 48/92* (2019.02); *B29C 2043/463* (2013.01); *B29C 2948/926* (2019.02); *B29C 2948/9259* (2019.02); *B29C 2948/92152* (2019.02); *B29C 2948/92209* (2019.02); *B29C 2948/92447* (2019.02); *B29C 2948/92885* (2019.02); *B29C 2948/92904* (2019.02); *B29K 2021/003* (2013.01); *B29L 2030/00* (2013.01)

(58) Field of Classification Search
USPC .......................................................... 427/411
See application file for complete search history.

(56) References Cited

U.S. PATENT DOCUMENTS

| | | | | |
|---|---|---|---|---|
| 4,428,896 A | * | 1/1984 | Stevenson | B29C 47/32 264/40.1 |
| 4,978,289 A | * | 12/1990 | Maejima | B29C 47/0021 425/141 |
| 5,128,077 A | * | 7/1992 | Stevenson | B29C 47/56 264/177.1 |
| 5,608,637 A | * | 3/1997 | Wang | B29C 47/0854 425/461 |
| 5,639,404 A | * | 6/1997 | Meier-Kaiser | B29C 43/245 264/175 |
| 2002/0048615 A1 | * | 4/2002 | Ohki | B29C 47/0021 425/145 |

* cited by examiner

METHOD FOR REGULATING AN EXTRUSION DEVICE AND EXTRUSION DEVICE USING SAID METHOD

This application is a 371 national phase entry of PCT/EP2013/077433, filed 19 Dec. 2013, which claims benefit of French Patent Application No. 1262816, filed 27 Dec. 2012, the entire contents of which are incorporated herein by reference for all purposes.

BACKGROUND

1. Field

The disclosure relates to the field of the extrusion of elastomeric compounds more particularly intended for the manufacture of tires.

2. Description of Related Art

As is known, the manufacture of the profiled elements of which tires are formed calls to a large extent upon extrusion devices which have the function of producing strips of rubber to a determined profile. These devices are formed of a barrel and of a screw mounted to rotate inside the said barrel.

The shape of the barrel and of the screw and the way in which they are arranged are contrived such that the rotating of the screw has the effect of supplying mechanical work to the compound with a view to increasing the fluidity thereof, on the one hand, and to propelling the said mixture towards an extrusion die with a view to giving the extruded product a determined profile, on the other.

The continuous strip leaving the extrusion means can be wound onto storage means with a view to later use. The invention is more particularly concerned with the extrusion devices used for feeding directly to a device downstream of the extrusion device.

One of the problems presented by the use of an extrusion device coupled more or less directly with a downstream device intended to use the continuous strip, such as a tire building means for example, is that the output of the extrusion means becomes more or less dependent upon the throughput of the device using it.

This results in significant variations in throughput which may range from complete stoppage to maximum demand on the extrusion installation at its nominal throughput. This difficulty is exacerbated by the need also to generate a product the profile of which remains constant during the phases in which consumption rate increases or decreases.

This problem is generally resolved by arranging compensating intermediate means between the outlet of the extrusion device and a downstream device for winding the extruded product. However, these compensating means are not suitable when the extruded product is to be applied directly to a downstream winding device.

Document U.S. Pat. No. 4,428,896 describes a method allowing control over the shape and dimensions of a profiled element obtained using an extruder, then transported by a conveyer to a downstream device. The control method is based on measuring the initial rotational speed of the internal screw of the extruder and the initial rotational speed of the roller, on measuring the thickness of the extruded profiled element as it leaves the extruder and as it leaves the conveyer, and on the linear weight thereof. The values of the rotational speed of the extruder screw and that of the roller are then each adjusted by their respective regulating unit on the basis of the measurements performed on the extruded profiled element, some distance away from the outlet of the extruder. Such a control method has the effect of introducing a delay into the regulation and is not suitable when the profiled element is to be applied directly to a downstream device situated at the outlet of the extruder.

One solution to this problem has been supplied by document FR 11/55591 in the name of the applicant company which describes a method and means for regulating an extruder of the roller tip type with the band obtained being laid directly onto a downstream device. According to that document, the rotational speed of the screw is directly proportional to the rotational speed of the roller and it is obtained by multiplying the roller speed by a proportionality coefficient the setpoint value of which is established beforehand experimentally. Control over the parameters of the band obtained at the outlet of the extruder is achieved by sensors coupled to the regulating means which act on the speed ratio between the roller and the extruder screw, correcting the proportionality coefficient setpoint value. This means that the throughput of the extruder screw can be synchronized at all times with that of the roller, while at the same time achieving a rapid response time for the regulating means.

The roller speed of the extruder described in that document dictates the rate at which the band is laid on the downstream device. Hence a problem arises when, under certain operating conditions, the efficiency of the screw drops, which implies that the regulating means need to command an acceleration in the rotational speed of the screw in order to keep the throughput constant. However, it has been found that, upwards of a certain screw speed value, the mixture inside the extruder suffers an increase in temperature. This causes gases to appear in the mixture, leading to bubbles in the band leaving the extruder and, sometimes, to degradation that may go so far as the formation of vulcanized agglomerations within the product leaving the extruder.

One solution to this problem is to measure the temperature of the compound inside the extruder or of the product leaving the latter, but that entails a delay in the regulation and leads to losses of time and of material.

Another solution is to permanently limit the speed of the laying roller to below a safe value, but at the expense of an obvious drop in the productivity of the extruder.

Indeed it has been established, during laboratory testing, that the efficiency of an extruder screw increases with the difference in temperature between the mechanical components of the extruder, which are at a high temperature as they are heated, and the strip of elastomer which is itself introduced continuously into the extruder at ambient temperature.

However, during a transient extruder stoppage, the heat energy from the components of the machine is transferred to the elastomeric compound and the temperature difference decreases. The consequence of this is that the efficiency of the screw decreases and when the extruder is restarted, it receives a command to accelerate the screw in order to compensate for the drop in efficiency. Such a situation leads to additional heating of the compound and causes the screw to run away.

The same thing happens if the extruder has an insufficient supply of elastomeric compound (for example if the strip of elastomer fed into the extruder breaks) when the throughput drops, the regulation control also dictates an acceleration of the screw, the consequence of this being that the screw runs away and the elastomeric compound is degraded.

SUMMARY

It is an object of an embodiment of the invention to propose a method for regulating an extrusion device that makes it possible, at every moment and with good productivity, to supply a continuous strip of extruded product of constant profile, of good quality, with no degradation of the elastomeric compound.

These objects are achieved using a method for regulating an extrusion device intended for the manufacture of a continuous strip of profiled product made of an elastomeric compound, comprising a screw rotationally driven in a fixed barrel the outlet of which comprises an extrusion die and at least one cylindrical roller driven in rotation and the axis of which is perpendicular to the direction in which the product leaves the die, the rotational speed of the screw ($\Omega_{screw}$) being directly connected to the rotational speed of the roller ($\Omega_{roller}$) by a proportionality coefficient, the said regulating method comprising the following steps:

for a given elastomeric compound and a given profiled product, a pre-established setpoint value Ks of the said proportionality coefficient, and the pre-established setpoint values for the roller speed $\Omega_{roller}$ up to a maximum setpoint roller speed $\Omega_{roller\ max}$, are determined, and the maximum rotational speed of the screw $\Omega_{screw\ max} = Ks*\Omega_{roller\ max}$ is determined, the thickness (e) of the profiled product leaving the extrusion die is measured at each instant, the setpoint value of the coefficient Ks is adjusted as a function of the value of the thickness (e) to a corrected value Ks' so as to bring the measured value of the thickness back to a setpoint value ($e_{setpoint}$) of the thickness of the profiled element, the rotational speed of the screw is corrected taking account of the new value Ks', such that $\Omega'_{screw} = Ks'*\Omega_{roller}$ The said method is characterized in that the roller setpoint speed is adjusted as a function of the corrected value Ks' of the proportionality coefficient when the rotational speed of the screw $\Omega'_{screw}$ exceeds a slip limit speed.

This method provides for the rotational speed of the screw to be directly proportional to the rotational speed of the roller and for it to be obtained by multiplying the roller speed by a proportionality coefficient the setpoint value of which is established beforehand experimentally. The roller speed is a setpoint value established for a given elastomeric compound and a predefined profiled product. This means that the screw speed can at every instant be synchronized with that of the roller in a ratio given by the proportionality coefficient, and that the throughput of the extruder and that of the roller can therefore be synchronized.

In order to improve the precision and response dynamics of the regulation control loop, the regulating method of the invention integrates the measurement of the thickness, which involves adjusting the proportionality coefficient using a correction factor, for example using a corrected proportionality coefficient which is equal to the product of the correction times the setpoint value of the proportionality coefficient. The screw speed is therefore calculated taking the corrected proportionality coefficient into consideration.

Thus, after having observed a reduction in the thickness of the profiled element leaving the extrusion device, the correction imposed by the change to the proportionality coefficient imposes an increase in the screw speed with respect to the roller speed.

According to an embodiment of the invention, the roller speed (which is the speed of laying onto a downstream device) is adapted according to the corrected value of the proportionality coefficient Ks so as to prevent the corrected value of the screw speed multiplied by the corrected proportionality coefficient from exceeding the slip limit speed of the screw. The slip limit speed is to be understood to mean a speed which has been determined experimentally for a given extrusion device and a predetermined elastomeric compound beyond which the screw begins to run away and turns without delivering any product. By way of example, the slip limit speed can be determined by monitoring the change in screw speed and comparing it at every instant to that of the roller, the slip limit speed value being observed when the screw speed becomes higher than the predetermined maximum speed for a given compound and when, at the same time, the roller speed is lower than the maximum speed allowed for a given compound.

Thus, when the screw speed reaches the slip limit speed, the laying speed is reduced, which means that the screw speed will drop as it is connected with the roller speed by the proportionality coefficient. In other words, the roller is slowed to prevent the screw from slipping and running away. If the corrected screw speed is below the slip limit speed, the roller can continue to turn at its pre-established setpoint speed.

That means that at any moment a profiled product can be laid that has good thickness and good physico-chemical characteristics of the elastomeric compound, and correct productivity of the extrusion device can be achieved.

Advantageously, the roller speed $\Omega_{roller\ law}$ is calculated in such a way that the screw speed does not exceed the slip limit speed, using the formula:

$$\Omega_{roller\ law} = (\Omega_{screw\ max}^{n/n-1}/\Omega_{roller\ max}^{1/n-1})*1/Ks^{n/n-1},$$

where n is a constant corresponding to a given elastomeric compound.

In an alternative form of the invention, the slip limit speed values could have been defined experimentally as a function of the roller speed and a curve then plotted illustrating the variation in slip limit speed and passing through a number of points thus defined. However, it is preferable to use a calculation method which is easier to implement in a regulation device that has digital computing means.

For preference, the calculated roller speed $\Omega_{roller\ law}$ is compared against the setpoint speed predefined for a given setpoint thickness $\Omega_{roller}$ and the lower of the two values is chosen as the reference roller speed value $\Omega_{roller\ ref}$.

What is meant by the reference speed of the roller is the speed imposed on the laying roller by the regulating means. The reference speed of the roller is thus automatically adapted by the regulating means of the invention as a function of the variation in the proportionality coefficient so as to prevent the screw from slipping while at the same time guaranteeing good extrusion-device productivity.

Advantageously, the rotational speed of the roller is reduced when the rotational speed of the screw exceeds a slip limit speed. Therefore, the screw speed will drop because it is directly connected by the proportionality coefficient to the speed of the roller, thereby making it possible to prevent the screw from slipping.

Advantageously, when the screw speed does not exceed the slip limit speed, the roller speed increases with the reduction in the corrected value Ks' of the proportionality coefficient.

This makes it possible, when the operating regime of the screw improves, namely when the hot compound has been discharged, the throughput per screw revolution has increased and the efficiency has improved, for a smaller correction to the proportionality coefficient Ks' to be commanded, the result of this being that the roller speed can increase gradually up to the values of a pre-established optimum operation for a given elastomeric compound and a given extrusion device.

The objective of an embodiment of the invention is also reached using an extrusion device intended for the manufacture of a continuous strip of profiled product made of an elastomeric compound, comprising regulating means able to implement the method of the invention, comprising a screw rotationally driven in a fixed barrel the outlet of which comprises an extrusion die and at least one cylindrical roller driven in rotation and the axis of which is perpendicular to the direction in which the product leaves the die, comprising means for controlling the rotational speed of the screw ($\Omega_{screw}$) as a function of the roller speed, the screw speed being directly connected to the rotational speed of the roller ($\Omega_{roller}$) by a proportionality coefficient, and, memory-storage means for storing the values determined for a given elastomeric compound and a given profiled product, the setpoint value Ks of the proportionality coefficient, and the setpoint values for the roller speed $\Omega_{roller}$ up to a maximum setpoint roller speed $\Omega_{roller\ max}$, for which the maximum rotational speed of the screw is $\Omega_{screw\ max} = Ks * \Omega_{roller\ max}$, measurement means which at each instant determine the thickness (e) of the profiled product leaving the extrusion die, a first regulating means which adjusts the setpoint value Ks of the proportionality coefficient as a function of the value of the thickness (e) to a value Ks' so as to bring the measured value back to a setpoint value ($e_{setpoint}$) of the thickness of the profiled element, a means for calculating the rotational speed of the screw taking account of the new value Ks', such that $\Omega'_{screw} = Ks' * \Omega_{roller}$, characterized in that it comprises control means which adjust the roller speed as a function of the corrected value Ks' of the proportionality coefficient when the rotational speed of the screw $\Omega'_{screw}$ exceeds a slip limit speed.

For preference, this device comprises the said control means which comprise means for calculating the roller speed $\Omega_{roller\ law}$ in such a way that the screw speed does not exceed the slip limit speed, using the formula:

$$\Omega_{roller\ law} = (\Omega_{screw\ max}^{n/n-1} / \Omega_{roller\ max}^{1/n-1}) * 1/Ks'^{n/n-1},$$

where n is a constant associated with a given elastomeric compound.

Advantageously, the said control means compare the calculated roller speed $\Omega_{roller\ law}$ against the setpoint speed predefined for a given setpoint thickness $\Omega_{roller}$ and they choose the lower of the two values as the reference roller speed value $\Omega_{roller\ ref}$.

For preference, the said control means reduce the rotational speed of the roller when the rotational speed of the screw exceeds a slip limit speed.

Advantageously, when the screw speed does not exceed the slip limit speed, the said control means increase the roller speed with the reduction in the corrected value Ks' of the proportionality coefficient.

BRIEF DESCRIPTION OF DRAWINGS

The invention will be better understood from the remainder of the description which relies on the following figures.

DETAILED DESCRIPTION OF SPECIFIC EMBODIMENTS

Figure 1:
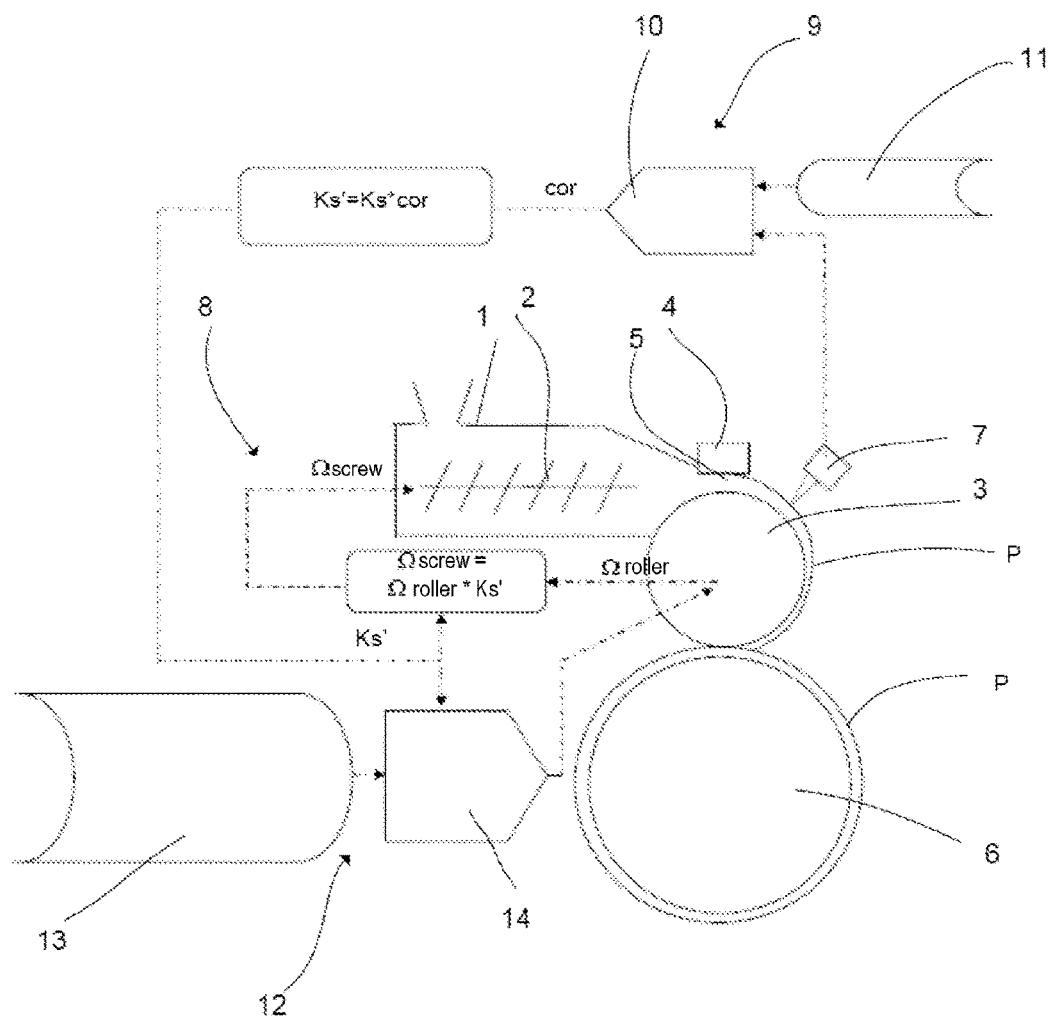
FIG. 1 schematically depicts an extrusion device of the invention and the regulation control loops used for implementing the method according to an embodiment of the invention.

The extrusion means depicted in FIG. 1 comprise a screw 2 rotationally driven by a motor (not depicted) in a cylindrical barrel 1. Downstream of the screw, the extrusion die 5 is formed by the gap between a profiled blade 4 and a roller 3 likewise rotationally driven. In one alternative form of the invention, the extrusion die 5 is formed between two rotary rollers, each one driven in rotation about its longitudinal axis which is perpendicular to the direction in which the profiled product leaves.

The roller 3 collaborates directly with the receiving surface of a drum 6 on which the product P is intended to be wound. In this configuration, the roller 3 also acts as a roller for applying the strip of extruded product onto the receiving surface. This arrangement proves to be particularly advantageous when, as in the example illustrated in FIG. 1, the desire is to wind a narrow strip of elastomeric compound of constant section by filament winding so as to reconstruct a final section on a receiving surface such as a tire building drum.

In order to be able to place the product P directly onto the receiving surface of the drum 6, there needs to be a possibility of varying the mass flow rate leaving the extruder in proportion to the exit speed, so that the cross section of the extruded profiled element remains constant. The exit speed may therefore be modified at will from a zero value to a nominal value without adversely affecting the geometry of the product.

In order to achieve that, the device comprises speed measuring means, such as optical encoders, which are associated with the roller 3 and with the screw 2 and a first regulation control loop 8 regulating the speed of the screw 2. Thus, the optical encoder associated with the roller 3 determines at each instant the rotational speed of the roller $\Omega_{roller}$ and transmits this information to the command controlling the screw speed, so that at any instant the rotational speed of the screw $\Omega_{screw}$ is equal to the product of the rotational speed of the roller $\Omega_{roller}$ times a proportionality coefficient K, such that $\Omega_{screw} = K * \Omega_{roller}$.

The setpoint value Ks of the proportionality coefficient K is determined experimentally for each elastomeric compound used with a specific extrusion device. To do that, a roller speed is selected and the screw speed needed in order to obtain a profiled element of the desired cross section is determined. It is found that this proportionality coefficient is substantially constant over the normal operating range of the extrusion device.

However, variations in the proportionality coefficient may be observed as a function of the throughput flow, because of variations in the pressure and temperature of the compound in the cavity upstream of the extrusion die. These variations can be assessed during the phase of learning and experimental determination of the proportionality coefficient.

In order to correct these linearity errors, a second regulation control loop 9 based on the measurement of the thickness "e" of the profiled element P directly as it leaves the extrusion die using a thickness measurement sensor 7, for example of the contactless type such as measurement means using a laser beam, is introduced. The measured value of the thickness "e" is input into a thickness regulator 10 which also receives the setpoint values of the thickness "$e_{setpoint}$" originating from the memory-storage means 11. The thickness regulator 10 calculates a correction coefficient "cor" for correcting the proportionality coefficient. Thus, the setpoint value of the proportionality coefficient Ks is modified to a corrected value Ks' so as to bring the measured value of the thickness e back to a setpoint value $e_{setpoint}$ of the thickness of the profiled element P.

The new value of the proportionality coefficient Ks' is input into the first regulation control loop 8 that regulates crew speed so that, using the corrected proportionality coefficient value Ks' obtained from the relationship Ks'=Ks*cor, the speed can be obtained using the relationship $\Omega'_{screw}=Ks'*\Omega_{roller}$ or $\Omega'_{screw}=Ks*cor*\Omega_{roller}$.

The monitoring of the difference between the measured thickness e and the setpoint thickness $e_{setpoint}$ is performed by a conventional PID-type regulator.

This regulation makes it possible to obtain a profiled product P of constant cross section leaving the extruder during continuous production. However, in a restart after a temporary production stoppage (which means a stoppage without emptying the barrel 1 of the device), the temperature of the elastomeric compound inside the extrusion device increases notably at the entry to the screw and the efficiency of the extrusion device drops. What happens is that it has been established that the optimum throughput per screw revolution is obtained when the elastomeric compound at the entry to the screw is cold (around 20° C.) and that at the exit of the screw is hot (around 110° C.) in relation to the temperature of the mechanical elements. As a result, during an extruder stoppage, the elastomeric compound at the entry heats up through prolonged contact with the hotter mechanical elements whereas the temperature of the elastomeric compound towards the exit drops upon contact with mechanical elements which are cooling.

The screw efficiency also drops when the feed rate of the extruder device drops or when the elastomeric compound inside the device becomes more fluid.

In order to correct for this drop in efficiency, the extrusion device of the invention comprises a third regulation control loop 12 that allows the laying speed, which is the reference speed of the roller, to be adapted as a function of the screw efficiency.

Because screw efficiency is expressed as the throughput of elastomer per screw revolution, for one and the same screw, the ratio between the roller speed and the screw speed is indicative of the inverse of the efficiency of the extruder screw. Thus, in order to maintain a constant cross section, as the screw efficiency drops, the command controlling the speed of the screw demands an accelerating of the screw in order to keep the throughput constant. Accelerating the screw under working conditions in which this screw has low efficiency, would lead to an increase in the temperature of the compound and, thereby, cause the screw to run away and to slip.

In order to avoid runaway of the screw on the occasion of a transient drop in its throughput per screw revolution, the solution proposed by the invention is to adapt the roller speed according to the change in the proportionality coefficient K. Thus, when the screw 2 receives a command to accelerate, the solution is to reduce the speed of the roller 3.

As a result, the speed of the screw 2 will drop because it is directly connected to the speed of the roller 3 by the proportionality coefficient.

In order to do that, the change in slip limit speed of the screw as a function of the roller speed and of the maximum screw speed acceptable for a given elastomeric compound is determined. This change in slip limit speed is taken into consideration by the roller speed control means which supply a reference value to the means that control the speed of the roller 3, in the way that will be explained on the basis of the example which follows.

Figure 2:
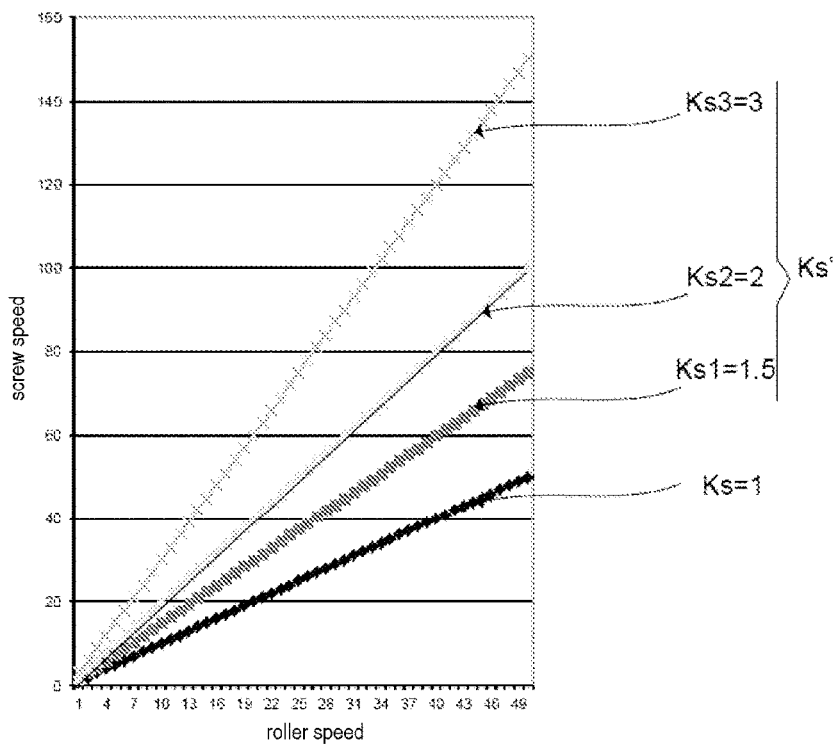
FIG. 2 illustrates the change in the proportionality coefficient as a function of the measured thickness of the profiled product for an elastomeric compound.

FIG. 2 illustrates an example of the way in which the proportionality coefficient K changes as a function of the measured thickness of the profiled product. Thus, the proportionality coefficient varies between a setpoint value Ks=1 (when the thickness is constant and equal to the setpoint value) and a corrected value Ks' (which takes into account the drop in thickness which is a consequence of the drop in throughput). In the example depicted in FIG. 2, the corrected values Ks' are Ks1=1.5, Ks2=2 and Ks3=3. The corrected value Ks' is applied to the relationship linking roller speed to screw speed so as to bring the thickness back to its setpoint value. It will be noted in FIG. 2, that, for certain roller speed values, the screw speed may reach high values depending on the Ks' value applied.

The invention proposes a third regulation control loop 12 comprising means 14 of controlling the roller speed as a function of the value of the corrected proportionality coefficient Ks' calculated by the second regulation control loop 9 so that the screw speed does not exceed the slip limit speed.

Figure 3:
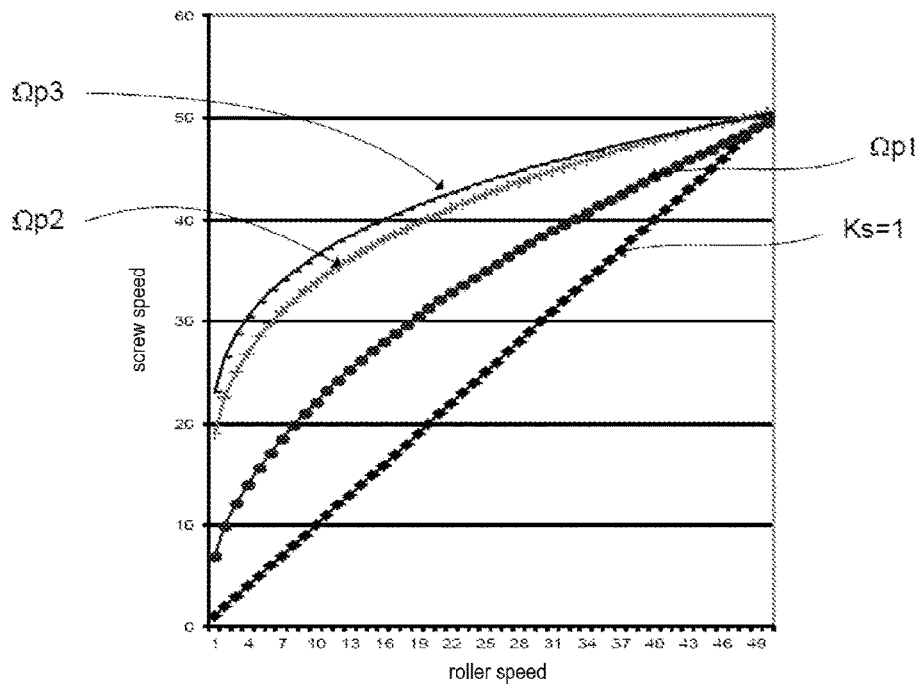
FIG. 3 illustrates various curves indicative of the slip limit speed for various elastomeric compounds.

FIG. 3 illustrates, using exponential curves, the change in screw slip limit speed for 3 elastomeric compounds and one and the same extrusion screw. The change in limit speed is defined in the example depicted using an evolution law the equation of which is $$\Omega_{screw} = a\sqrt[n]{\Omega \text{ roller}} \tag{1}$$

where $a=\Omega_{screw\ max}/\Omega_{roller\ max}^{1/n}$, and n is a constant associated with a given elastomeric compound.

In the example depicted, the first curve $\Omega_{p1}$ is plotted for a constant n=2 and a coefficient a=7, the second curve $\Omega_{p2}$ is plotted for a constant n=4 and a coefficient a=19, and the third curve $\Omega_{p3}$ is plotted for a constant n=5 and a coefficient a=23. The constant n is dependent on the type of elastomeric compound used and is preferably comprised between 2 and 6. Thus it is found that the higher the constant n, the smaller the limitation applied to the laying speed.

It is also known that, according to the regulation control loops of the device of the invention:

$$\Omega_{screw}=Ks'*\Omega_{roller} \tag{2}$$

Substituting the screw speed of equation (2) into equation (1) gives the calculated roller speed:

$$\Omega_{roller\ law}=(\Omega_{screw\ max}^{n/n-1}/\Omega_{roller\ max}^{1/n-n})*1/Ks^{n/n-1}$$

The roller speed $\Omega_{roller\ law}$ can thus be calculated as a function of the corrected proportionality coefficient Ks'. This calculated value of the roller speed is analysed by the control means 14 which compare it against the setpoint speed $\Omega_{roller}$ determined for a pre-established recipe. Such a recipe is created for a given elastomeric compound and a given setpoint thickness and is stored in the memory 13 of the third regulation control loop 12 of the device. The values that characterize a recipe are: the roller setpoint speed, the roller maximum speed, the screw maximum speed, the setpoint value Ks of the proportionality coefficient and the constant n. If the calculated value of the roller speed $\Omega_{roller\ law}$ is lower than the setpoint roller speed defined in the recipe, then the reference roller speed value chosen by the control means is the calculated value of the roller speed $\Omega_{roller\ law}$. In the opposite case, the reference roller speed value is that defined in the recipe.

Figure 4:
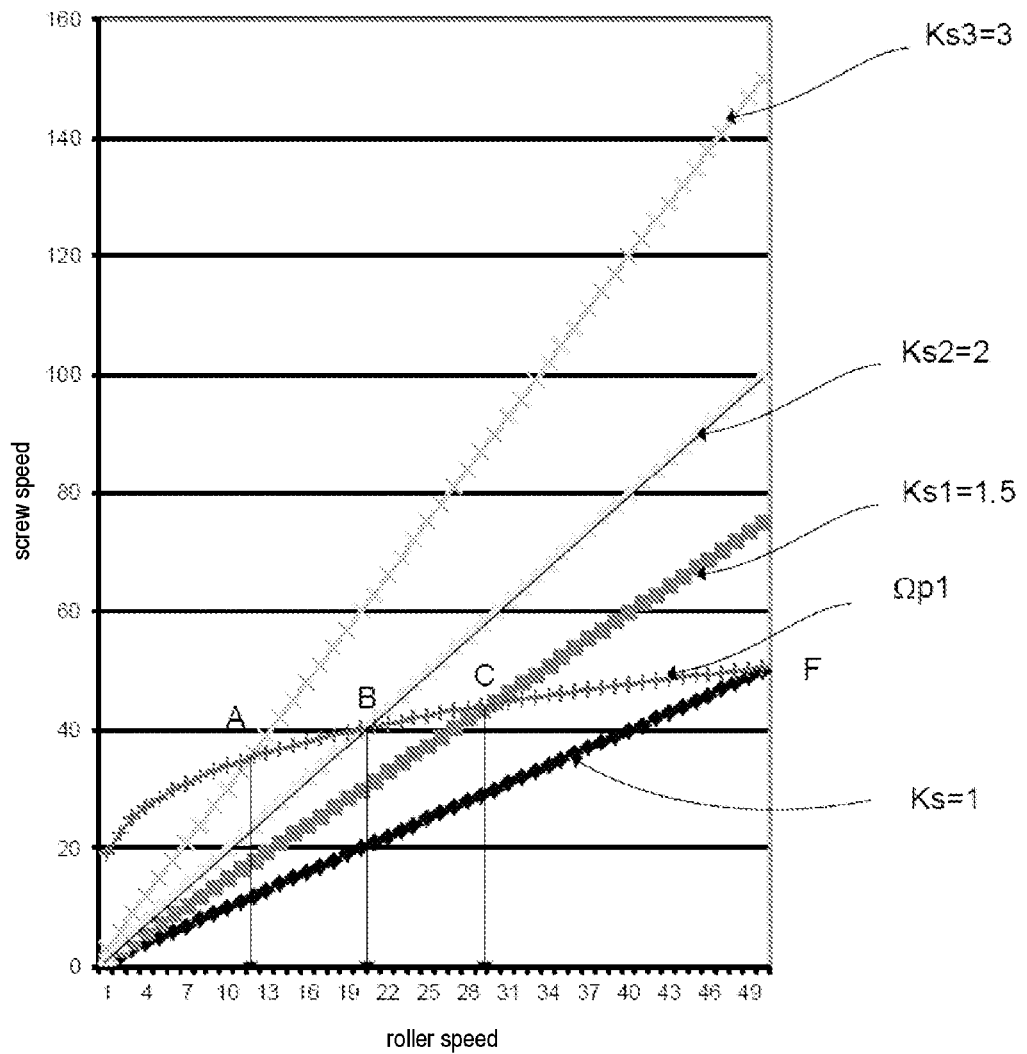
FIG. 4 graphically depicts the application of the regulation method of an embodiment of the invention to an elastomeric compound.

This regulating method may also be explained with reference to FIG. 4 in which the straight lines representing the proportionality coefficients of FIG. 2 and a screw slip limit speed curve illustrated in FIG. 3 have been superposed. The reference speed of the roller is the point of intersection between the curve $\Omega_{p1}$ and the reference straight line of the coefficient Ks. Thus, when the corrected screw speed is on the straight line $Ks_3$, but above the curve $\Omega_{p1}$, the roller speed at the point A is chosen. For a roller speed corresponding to the point A, the extrusion device may produce a profiled element P of the correct thickness, but at a laying speed that is lower than that of the recipe. When the operating regime of the screw improves, i.e. when the hot mixture has been discharged, the throughput per screw revolution increases and the efficiency improves, which means that the regulation control loop commands a smaller correction to the proportionality coefficient Ks' and the roller speed can increase up to values corresponding to the point B, then to the point C, up to the point F which corresponds to the maximum values for the screw and roller speeds.

Thus, using the regulating method and the device of an embodiment of the invention, automatic adjustment of the roller speed (or of the laying speed) is obtained for an extrusion device screw speed that avoids slippage and supplies a profiled product of the correct dimensions and correct physico-chemical properties, for optimal productivity of the device.

Other alternative forms and modes of embodiment of the invention may be conceived of without departing from the scope of the claims thereof.

The invention claimed is:

1. A method for regulating an extrusion device adapted for the manufacture of a continuous strip of profiled product (P) made of an elastomeric compound, comprising a screw rotationally driven in a fixed barrel the outlet of which comprises an extrusion die and at least one rotationally driven cylindrical roller, the rotational speed of the screw (Ω screw) being directly connected to the rotational speed of the roller (Ω roller) by a proportionality coefficient, the regulating method comprising:

for a given elastomeric compound and a given profiled product (P), determining a setpoint value Ks of the proportionality coefficient, and the setpoint values for the roller speed Ω roller up to a maximum setpoint roller speed Ω roller max for which the maximum rotational speed of the screw is Ω screw max=Ks*Ω roller max, for the given elastomeric compound and the given extrusion device, determining a slip limit speed as being a mean rotational speed for the screw whereby the screw turns without delivering the profiled product (P), measuring the thickness (e) of the profiled product (P) directly as the profiled product (P) leaves the extrusion die is measured at each instant, correcting the setpoint value of the coefficient Ks as a function of the measured value of the thickness (e) to a corrected value Ks' so as to bring the measured value back to a setpoint value (e setpoint) of the thickness of the profiled element (P), correcting the rotational speed of the screw taking account of the new corrected value Ks' of the proportionality coefficient, such that Ω' screw=Ks'*Ω roller wherein the roller speed is adjusted as a function of the corrected value Ks' of the proportionality coefficient, the roller speed is lowered when the rotational speed of the screw Ω' screw exceeds the slip limit speed, and the roller screw speed is maintained if the corrected screw speed is below the slip limit speed.

2. The regulating method according to claim 1, wherein when the screw speed does not exceed the slip limit speed, the roller speed increases with the reduction in the corrected value Ks' of the proportionality coefficient.

* * * * *